United States Patent Office 2,815,804
Patented Dec. 10, 1957

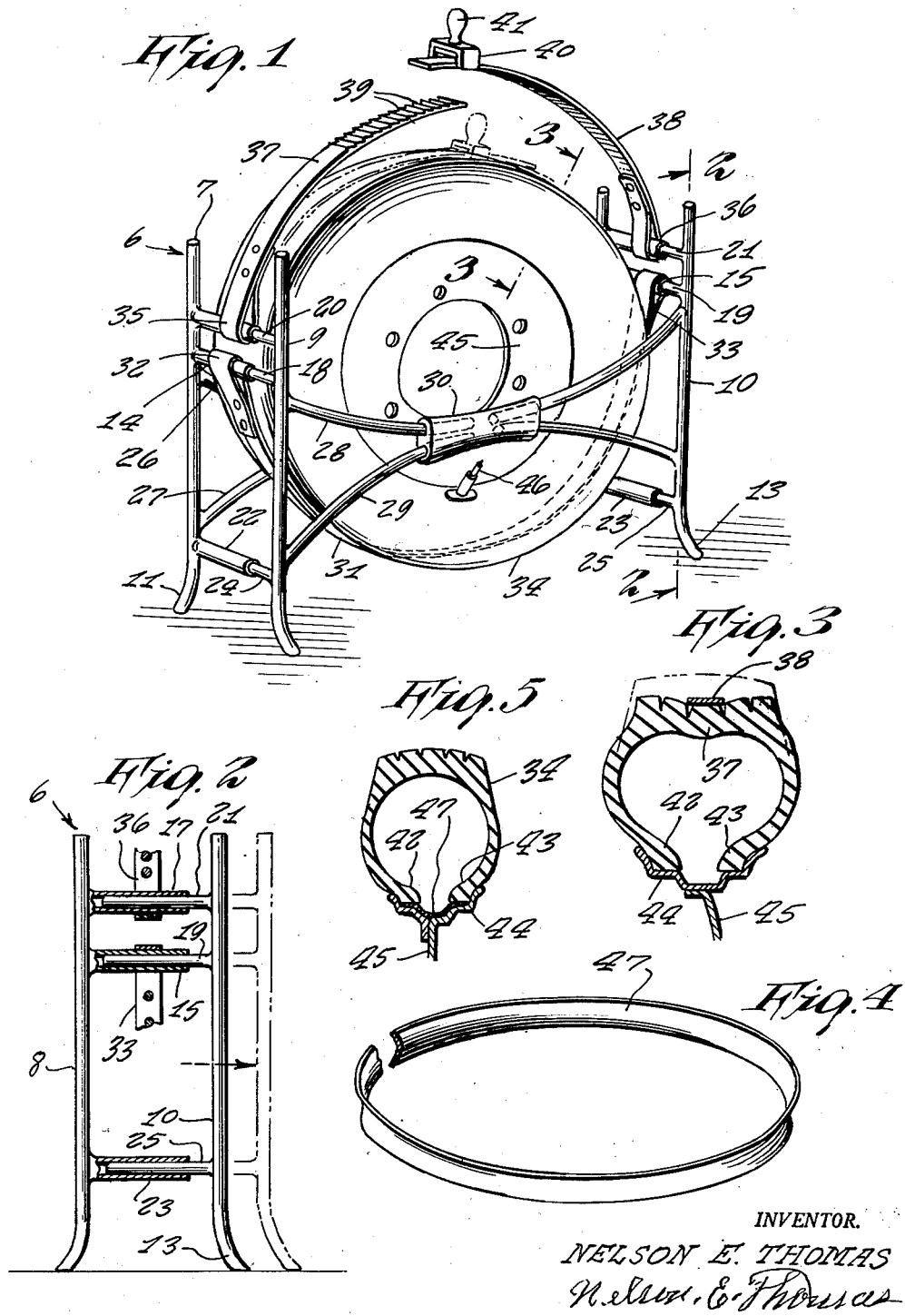

2,815,804

ADJUSTABLE TUBELESS TIRE BEAD SEATING DEVICE AND SUPPORT

Nelson Ewing Thomas, Perris, Calif.

Application April 12, 1956, Serial No. 577,818

3 Claims. (Cl. 157—1.21)

This invention relates to tire supports and inflating devices and the like, and particularly to what I choose to term a tubeless tire bead seating device and support.

The main object of my invention is to provide a special supporting and clamping device for compressing and holding a tubeless tire casing to a tire rim while this casing is being inflated until the air pressure becomes sufficient to retain the tire casing in place on the mentioned rim without further support.

Another object of my invention is to provide a supporting and clamping device or machine for squeezing a tire casing to the tire rim without the necessity of manually supporting or pressing the casing or in any inconvenient manner handling the casing.

A further object of this invention is to produce the tubeless tire bead seating device in the form of a frame built up of pipe members and joints as well as telescoping portions allowing various adjustments to be made in order to treat each casing to best advantage.

It is also an object of the invention to have such a tire bead seating device which is capable of adjustment for different sizes and weights of tire casings so that substantially any casing of any make or type of vehicle may be supported and held until inflated.

It is, of course a practical object, withal to have a tubeless tire bead seating device of the character indicated which is light and relatively simple in construction and easy to use, and likewise easy to manufacture at a reasonable figure in order to encourage wide distribution on the market and, in fact general adoption.

Other objects and advantages of my invention will appear in greater detail as the specification proceeds.

In order to facilitate ready comprehension of this invention for a proper appreciation of the salient features thereof, the invention is illustrated on the accompanying drawing forming part hereof, and in which:

Figure 1 is a perspective view of the tubeless tire bead seating device made according to the invention and embodying the same in a preferred form and shown in actual operation;

Figure 2 is a vertical transverse section of the same device as taken on line 2—2 of Figure 1;

Figure 3 is a transverse section of the tire casing supported in the device of Figures 1 and 2, but taken on line 3—3 in the first Figure 1;

Figure 4 is a perspective view of a member included with the invention when required for certain tire casings; and Figure 5 is a section of the tire casing showing the member of Figure 4 included in use therewith.

Throughout the views, the same reference numerals indicate the same or like parts and features.

While tubeless tires do not require inflated inner tubes, they do nevertheless require a quantity of air within them under pressure, and if some air has escaped, or the tire casing has been shifted, replaced or has otherwise caused loss of air pressure, air must be pumped into the casing to restore the same to normal condition. Such inflation of tubeless tires has presented a problem, as the tires are not as readily held in position on the tire rims as might be desired, so that air tends to escape during inflation. Upon considering this problem, it has occurred to me that a device or machine should be available for supporting and squeezing the tire casing to be inflated so that the beads of the tire fit tightly against the bottom and the flanges of the rim by being confined thereon during inflation and thereby avoid all escape of air during this step. As a result, I have succeeded in producing a tubeless tire bead seating device along the lines already indicated, as will now be set forth in detail in the following, due reference being had to the drawing.

Hence, in the practice of my invention, the machine primarily includes a standing frame, generally indicated at 6 which has four corner posts 7, 8, 9 and 10 and the same are bent outwardly at the bottom to form feet 11, 13, etc. Upon the posts 7 and 8 at two different levels are fixed horizontal sleeves such as 14, 15, and 17 all parallel and directed in the same general direction toward posts 9 and 10. Upon the latter two posts are fixed corresponding horizontal studs 18, 19, 20 and 21 slidably fitting in sleeves 14 to 17, all of these sleeves and studs being located in the upper portion of the frame and serving two purposes simultaneously.

However, before explaining the full use of the mentioned post sleeves and studs, the two lower horizontal reinforcing sleeves 22 and 23 on posts 7 and 8 and the lower studs 24 and 25 slidably fitting in sleeves 22 and 23, should be noted. In addition, at the rear, a pair of arcuate reinforcing bars 26 and 27 are secured at their outer ends to rear posts 7 and 8 to unite them into a unit. In similar fashion, a front pair of arcuate bars 28 and 29 are secured at their outer ends to the front posts 9 and 10 to unite the same into a front frame unit. Upon the intermediate section of the reinforcing bars mentioned is mounted a junction member 30 so that the bars may actually be built up of shorter sections, and the same construction may also be used for the rear bars 26 and 27.

Returning now to the upper sleeves and studs 14 to 17 and 18 to 21, it is to be noted that upon sleeves 14 and 15 are mounted the end loops of a strong metal band 31 at 32 and 33 serving to carry a tire casing 34. Above sleeves 14 and 15, the other sleeves 16 and 17 also have the end loops 35 and 36 mounted thereon of an upper band consisting of two mating band sections 37 and 38, upon arcuate member 37 is formed a series of ratchet teeth 39, while upon the other similarly curved member 38 is fixed a yoke or bridge 40 with a finger piece 41 so mounted that the toothed end 39 of section 37 may be passed beneath yoke 40 upon section 38 and caused to engage with the yoke while the band thus completed on top of the tire may be manually tightened by pulling the handle or finger piece 41 to squeeze this tire as shown in Figure 3. Such initial squeezing of the tire casing serves to bring its beads 42, 43 down upon the rim 44 of wheel 45, so that when air under pressure is introduced into the casing by way of tire valve 46, the air does not escape or leak, but soon fills the tire, so that the band sections 37 and 38 may be released by lifting the yoke 40 upwardly with any suitable tool to cause it to release the ratched teeth so that when band sections 37 and 38 may be swung outwardly apart and the inflated tire lifted out from the frame.

If the tire is narrow, the frame may be pushed together so as to cause the studs to slide farther into the sleeves, but if the tire should be wide, then the front frame unit and rear frame unit will simply tend to slide apart by the studs sliding part way out of the sleeves. The frame as a whole is thus virtually self adjusting for various widths or thicknesses of tire casings, and is capable of confining the same about the periphery thereof to ensure inflation with compressed air at will and in convenient manner.

Upon occasion, it is desirable to further ensure air tight contact between the tire casing and the rim of the wheel, and this condition is served by laying in upon the wheel rim a live rubber ring or collar 47 immediately beneath the tire beads 42, 43, so that almost any casing whatsoever may be converted into a tubeless tire when this rubber or flexible plastic collar is used upon the wheel.

The frame previously described may be built up of pipe members and the studs may either be solid shafts or short pipe elements, and this is true also of the reinforcing bars, such hollow or solid construction merely changing the weight of the parts but not their operation or actual nature for the purpose of the invention.

Manifestly, variations may be resorted to, and parts and features may be modified or used without others within the scope of the appended claims.

Having now fully described my invention, I claim:

1. An adjustable tubeless tire bead seating device and support comprising, in combination, a supporting frame for suspending the rim or wheel mounted tire to be inflated, means for engaging about the periphery of the tire and exerting initial inward pressure thereon radially to contract the periphery at least to a limited extent prior to inflation in order to cause the beads of said tire to engage the bottom and the flanges of the rim of the wheel upon which the tire is mounted and hold them engaged until the internal pressure within the tire builds up sufficiently to cause the beads to positively grip said rim flanges, said frame including a group of upright posts with lateral connecting members, said means for engaging about the periphery of the tire comprising a lower suspension band connected at the ends thereof to two connecting members for supporting the underside of the tire, a pair of arcuate band sections connected at their outer respectively remote ends to two further connecting members, with means upon the band sections for releaseably interconnecting said sections upon the exterior of the tire.

2. A tubeless tire bead seating device according to claim 1, in which the one band section has a series of ratchet teeth thereon and the other section has a yoke adapted to receive the other section therethrough and engage with the teeth thereon, 3. A tubeless tire bead seating device according to claim 2, in which the frame has four corner posts the first two of which are provided with horizontal sleeves extending toward the other two posts and said other two posts having corresponding horizontal studs fitting slidably in said sleeves, and wherein connecting members interconnect the first two posts and other connecting members similarly interconnect the other two posts to form a separable frame unit.

References Cited in the file of this patent

UNITED STATES PATENTS

| | | |
|---|---|---|
| 292,817 | Holmes | Feb. 5, 1884 |
| 331,704 | Heusser | Dec. 1, 1885 |
| 668,700 | Werner | Feb. 26, 1901 |
| 1,016,184 | Thompson | Jan. 30, 1912 |
| 1,966,580 | Bull | July 17, 1934 |
| 2,684,112 | Coats | July 20, 1954 |